United States Patent [19]

Liimatta et al.

[11] Patent Number: 5,198,152

[45] Date of Patent: Mar. 30, 1993

[54] PRECERAMIC COMPOSITIONS AND CERAMIC PRODUCTS WITH AN UNSATURATED ORGANIC OR ORGANOSILICON COMPOUND

[75] Inventors: Eric W. Liimatta; Yuan-Fu Yu, both of Baton Rouge, La.

[73] Assignee: Ethyl Corporation, Richmond, Va.

[21] Appl. No.: 647,530

[22] Filed: Jan. 15, 1991

[51] Int. Cl.5 .................... C09K 3/00; C04B 35/52
[52] U.S. Cl. .................... 252/389.31; 252/400.31; 501/88; 501/92; 501/95; 501/96
[58] Field of Search .............. 501/88, 92, 95, 96; 252/389.31, 400.31

[56] References Cited

U.S. PATENT DOCUMENTS 4,650,837 3/1987 Seyferth et al. .................. 501/88 X
4,720,532 1/1988 Seyferth et al. .................. 501/88 X
4,767,876 8/1988 Seyferth et al. .................. 528/28 X
5,030,744 7/1991 Funayama et al. ................ 556/402

Primary Examiner—Peter A. Nelson
Attorney, Agent, or Firm—Patricia J. Hogan

[57] ABSTRACT

A crosslinkable preceramic composition suitable for use as an infiltrant for porous ceramics, such as fiber-reinforced ceramic composites, comprises about 75-99% by weight of a low molecular weight polysilazane and about 1-25% by weight of an unsaturated organic or organosilicon compound containing at least two alkenyl groups, preferably methylvinylcyclosilazane. Infiltration of composites with the infiltrant can be accomplished by melt or solution infiltration, and the subsequent pyrolysis of the infiltrant results in the formation of a densified ceramic article having improved strength.

20 Claims, No Drawings

PRECERAMIC COMPOSITIONS AND CERAMIC PRODUCTS WITH AN UNSATURATED ORGANIC OR ORGANOSILICON COMPOUND

FIELD OF INVENTION

This invention relates to polysilazane compositions having improved flow and more particularly to such compositions which are useful as infiltrants for fiber-reinforced ceramic composites.

BACKGROUND

Fiber-reinforced ceramic composites are materials which have many utilities and are used, e.g., for aeronautical applications, radome protection, draw rollers for synthetic filaments, and tools. However, such composites as normally prepared are porous materials which have less strength than is sometimes desired.

Copending application S.N. (Case CE-6102-B) (Yu et. al.) teaches that the density and strength of these composites can be increased by (A) infiltrating them with a crosslinkable preceramic composition comprising about 40-70% by weight of a low molecular weight polysilazane, about 15-35% by weight of a medium molecular weight polysilazane, and about 5-30% by weight of an unsaturated organic or organosilicon compound containing at least two alkenyl groups and (B) heating the infiltrated composite to pyrolyze the infiltrant.

As discussed by Yu et. al., such infiltrants have lower viscosities and higher ceramic yields than conventional polysilazanes, such as the polysilazanes of U. S. Pat. Nos. 4,297,828 (Seyferth et. al.-I), 4,482,669 (Seyferth et. al.-II), 4,645,807 (Seyferth et. al.-III), 4,650,837 (Seyferth et. al.-IV), 4,659,850 (Arai et. al.), and 4,869,854 (Takeda et. al.).

SUMMARY OF INVENTION

It has now been found that other compositions suitable for use as infiltrants and as binders for ceramic powders can be obtained by the provision of a crosslinkable preceramic composition comprising about 75-99% by weight of a low molecular weight polysilazane and about 1-25% by weight of an unsaturated organic or organosilicon compound containing at least two alkenyl groups.

DETAILED DESCRIPTION

The polysilazane used in the practice of the invention may be any suitable polysilazane having an appropriate molecular weight. For example, it may be a polysilazane of any of Seyferth et. al.-I, -II, -III, and -IV, Arai et. al., and Takeda et. al., the teachings of all of which are incorporated herein by reference. In a preferred embodiment of the invention, it is a polysilazane having a relative viscosity of 1.12-1.16, measured as a solution of by weight of the polymer in tetrahydrofuran: and it is a polymer prepared by the process of Seyferth et. al.-II, i.e., by reacting an organodihalosilane, such as methyldichlorosilane, with ammonia and polymerizing the ammonolysis product with a basic deprotonation catalyst, such as potassium hydride.

The unsaturated compound employed in the composition is an organic or organosilicon compound containing at least two I alkenyl groups. Such compounds are known, as evidenced by U.S. Pat. No. 4,719,273 (Seyferth et. al.-V), the teachings of which are incorporated herein by reference. As in Seyferth et. al.-V, the alkenyl groups are preferably alkenyl groups containing 2-6 carbons, such as vinyl, allyl, 3-butenyl, α-propenyl, etc.; and the utilizable compounds include organic compounds such as divinylbenzene, polybutadienes having a high 1,2-content, β-trivinyl-N-triphenylborazine, triallylcyanurate, etc. However, also as in Seyferth et. al.-V, the preferred compounds are organosilicon compounds in which the alkenyl groups are substituted or unsubstituted vinyl or allyl groups, most preferably unsubstituted vinyl groups.

Among the more preferred unsaturated compounds for use in the compositions are organosilicon compounds corresponding to the formulas:

 and

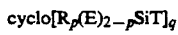

wherein E is a substituted or unsubstituted vinyl or allyl group; Z is O, S, NH, NR′, methylene, ethylene, phenylene, or other organic bridge; T is O, S, NH, NR′, methylene, CH=CH, or C≡C; R and R′ are independently selected from substituted and unsubstituted alkyl groups containing 1-6 carbons and substituted and unsubstituted aryl groups containing 6-10 carbons; m is 0, 1, or 2; n and p represent 0 or 1; and q is at least 3 when T is O and is otherwise at least 2.

The most preferred unsaturated compounds are the organosilicon compounds corresponding to the formula:

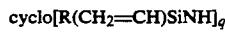

especially those in which R is methyl and q is at least 3 and including mixtures thereof, e.g., methylvinylcyclosilazane. However, other particularly desirable unsaturated compounds are the coammonolysis products of R(CH$_2$=CH)SiCl$_2$ and RSiHCl$_2$, especially those in which R is methyl.

The unsaturated compounds used in the compositions are liquids which improve the flowability of the formulations and which react with the polysilazanes at elevated temperatures, e.q., temperatures of 80°-100° C., to achieve crosslinking in the presence of a catalyst, usually a free radical catalyst, such as those employed in the hydrosilylation process of Seyferth et. al.-V, and preferably an azo catalyst, such as azobisisobutyronitrile, or a high temperature peroxy catalyst, such as di-t-butyl peroxide.

Ceramic articles which can be improved by being infiltrated with the compositions of the invention are those which are porous and therefore capable of being densified by the infiltration, especially porous fiber-reinforced ceramic composites. Such composites, of course, are well known and are prepared in various ways, conveniently by coating loose fibers or fibers that have been woven into a mat with a liquid preceramic composition, e.g., a slurry of ceramic powder in a solution of a preceramic polymer, drying the coated fibers to bond them with the preceramic composition, and then pyrolyzing the preceramic composition to form a ceramic matrix around the fibers.

The fibers used in preparing such composites are usually carbon fibers or ceramic fibers, depending on the intended use of the composites; and carbon fibers are generally precoated with an adherent, oxidationresistant coating before being contacted with the matrix-forming precursor when the composites are intended for use at elevated temperatures at which the carbon fibers would otherwise be subject to oxidative deterioration.

The preceramic compositions employed to form the matrices of such composites also vary in type. One type of preceramic composition that has been found to be valuable in forming the matrices is a slurry of a ceramic powder, such as silicon carbide and/or silicon nitride, in a solution of one or more polysilazanes; and it could also be valuable to use as the preceramic composition a formulation of Yu et. al. (the teachings of which are incorporated herein by reference) which is (A) a crosslinkable preceramic composition comprising about 40-70% by weight of a low molecular weight polysilazane, about 15-35% by weight of a medium molecular weight polysilazane, and about 5-30% by weight of an unsaturated organic or organosilicon compound containing at least two alkenyl groups or (B) a mixture thereof with a ceramic powder, e.g., a mixture of about 60-30% by weight of the preceramic composition and about 40-70% by weight of a silicon carbide and/or silicon nitride ceramic powder or a mixture thereof with up to about 30% by weight of one or more polysilazanes having low, medium, or high molecular weights.

In the Yu et. al. compositions that can be used to form the matrices of composites, the low molecular weight polysilazanes and unsaturated compounds employed are of the same types as those taught above as useful in the preparation of the compositions of the present invention; and the medium molecular weight polysilazanes are similar to the low molecular weight polysilazanes except for having higher molecular weights, e.g., molecular weights such as to provide relative viscosities of 1.3-1.4, measured as solutions of 5% by weight of the polymers in tetrahydrofuran.

Another type of matrix-forming composition that can be
used is a formulation comprising (A) about 40-70% by weight of a silicon carbide and/or silicon nitride ceramic powder or a mixture thereof with up to about 30% by weight of one or more polysilazanes having low, medium, or high molecular weights and (B) about 60-30% by weight of the crosslinkable preceramic composition of the present invention. Also, as in the case of the Yu et. al. compositions, the crosslinkable preceramic composition of the invention can serve as a matrix-forming composition by itself or in mixtures containing less than 40-70% by weight of ceramic powder.

Regardless of the nature of the porous ceramic article that is infiltrated with a composition of the invention, it may be infiltrated by immersing the article in a liquid comprising the composition to infiltrate its pores, recovering the infiltrated article, and heating it at 850°-1400° C. to pyrolyze the infiltrant. This procedure results in the formation of a ceramic article which has been rendered less porous by the formation of interspersed areas of ceramic derived from the infiltrant and which is therefore denser and stronger than the original porous article, and it can be repeated one or more times to incorporate more infiltrant when greater densification is desired.

The infiltrant may be used in this procedure in the form of a solution or as a melt; and, in either case, infiltration may be facilitated by the use of vacuum infiltration—a technique in which air is pumped from the pores of the article before it is immersed in the infiltrant. At the times when a porous article is to be infiltrated more than once, and it is desired to utilize vacuum infiltration, this technique may be used for one, some, or all of the infiltrations.

When the infiltrant is used in solution form, the solvent may be any suitable organic solvent, such as an aliphatic or aromatic hydrocarbon or a dialkyl or alicyclic ether; and the process may be conducted at room temperature and atmospheric pressure or at higher temperatures, e.g., temperatures up to about 300° C., and/or higher pressures. The use of the higher temperatures and/or pressures may facilitate the incorporation of larger amounts of infiltrant, and there does not appear to be any maximum to the amount of pressure that may be used. However, when pressure is used, it is generally a pressure not higher than about 14 MPa, e.g., a pressure in the range of about 1.4-14 MPa.

When the infiltrant is used as a melt, the infiltration is ordinarily conducted at a temperature of at least about 100° C., e.g., at about 100°-300° C., and it is generally preferred to conduct the procedure under pressure to increase the efficiency of the infiltration. Pressure, when utilized, is ordinarily a pressure of at least about 1.4 MPa. As is the case in the solution infiltration, there does not appear to be any maximum to the amount of pressure that can be used, but the pressures most commonly used are in the range of about 1.4-14 MPa.

When the desired degree of densification has been achieved, the thus-strengthened article may be subjected to any of the treatments to which the uninfiltrated articles would have been subjected before being used in their particular intended applications. For example, when the article is a fiber-reinforced ceramic composite which is susceptible to oxidative deterioration at elevated temperatures and is intended for use at such temperatures, it is provided with a protective coating to minimize the oxidative degradation that might occur during use.

The invention is advantageous in that the infiltrants can be easily incorporated into porous ceramics by solution or melt infiltration and then pyrolyzed to provide densified ceramics of higher strength. Compared with known infiltrants, the infiltrants of the invention provide greater densification with greater ease, and their ceramic yield is high.

The following examples are given to illustrate the invention and are not intended as a limitation thereof. Unless otherwise specified, quantities mentioned in the examples are quantities by weight.

In these examples, the polysilazanes are products obtained by reacting methyldichlorosilane with ammonia and polymerizing the ammonolysis product with potassium hydride, as in Seyferth et. al.-II; and their designations as low, medium, and high molecular weight polysilazanes indicate that their relative viscosities, measured as solutions of 5% by weight of the polymers in tetrahydrofuran, are 1.12-1.16, 1.3-1.4, and 1.76, respectively.

EXAMPLE I

Preparation of Infiltrant

Dissolve 82 parts of the low molecular weight polysilazane, 14 parts of methylvinylcyclosilazane, and 4 parts of di-t-butyl peroxide in 90 parts of distilled tetrahydrofuran. Stir the solution for 30 minutes, and strip off the tetrahydrofuran under vacuum.

EXAMPLE II

Preparation of Composite

Part A

Sequentially size the fibers in a carbon fiber mat with (A) a mixture of 25 parts of aluminum sec-butoxide, 25 parts of zirconium propoxide, 25 parts of polysilazane, and 12.5 parts of tetrakis(diethylamino)titanium and (B) polycarbosilane.

Part B

Prepare a matrix composition by dispersing a mixture of 45 parts of SiC powder and 15 parts of the high molecular weight polysilazane in 40 parts of a 68% toluene solution of a 12/5/3/1 mixture of the low molecular weight polysilazane, the medium molecular weight polysilazane, methylvinylcyclosilazane, and azobisisobutyronitrile.

Part C

Paint the matrix composition of Part B onto the sized carbon fiber mat of Part A and allow the painted fibers to dry in an inert atmosphere to form a prepreg. Cut the prepreg into uniform pieces, stack five pieces together, and uniaxially press them while heating them to 70° C. Then, with a small weight on the stack, crosslink and pyrolyze the matrix by heating under nitrogen from room temperature to 1300° C.

EXAMPLE III

Infiltration of Composite

Prepare four infiltrated composites by (A) immersing a composite of Example II in a melt of the infiltrant of Example I to permit infiltration of its pores at a temperature of 100° C. and under a pressure of 1.4 MPa for one hour, (B) recovering the infiltrated composite, (C) heating it to 1300° C. to pyrolyze the infiltrant, and (D) repeating the infiltration and pyrolysis four times. The infiltrated composites show weight gains of 77-86%, with an average of 81.7%.

The results of the foregoing experiment demonstrate the superiority of the infiltrants of the invention in densifying porous ceramics when compared with (1) the low molecular weight polysilazane alone as a melt infiltrant and (2) the high molecular weight polysilazane as a solution infiltrant. In the former case, the infiltrated composites have weight gains of 45-59% with an average of 49.5%. In the latter case, the infiltrated composites have weight gains of 35-42% with an average of 38.5%.

What is claimed is:

1. A crosslinkable preceramic composition comprising about 75-99% by weight of a low molecular weight polysilazane and about 1-25% by weight of an unsaturated organic or organosilicon compound containing at least two alkenyl groups.

2. The composition of claim 1 wherein the polysilazane is a polymer which has been prepared by reacting an organodihalosilane with ammonia and polymerizing the ammonolysis product with a basic deprotonation catalyst and which has a relative viscosity of 1.12-1.16, measured as a solution of 5% by weight of the polymer is tetrahydrofuran.

3. The composition of claim 2 wherein the organodihalosilane is methyldichlorosilane and the basic catalyst is potassium hydride.

4. The composition of claim 1 wherein the unsaturated compound is an organosilicon compound.

5. The composition of claim 4 wherein the organosilicon compound is a compound corresponding to one of the formulas:

$SiE_4$, $[R_m(E)_{3-m}Si]_2Z_n$, and $cyclo[R_p(E)_{2-p}SiT]_q$ wherein E is a substituted or unsubstituted vinyl or allyl group; Z is O, S, NH, NR', methylene, ethylene, phenylene, or other organic bridge; T is O, S, NH, NR', methylene, $CH=CH$, or $C=C$; R and R' are independently selected from substituted and unsubstituted alkyl groups containing 1-6 carbons and substituted and unsubstituted aryl groups containing 6-10 carbons; m is 0, 1, or 2; n and p represent 0 or 1; and q is at least 3 when T is O and is otherwise at least 2.

6. The composition of claim 5 wherein the organosilicon compound is one or more compounds corresponding to the formula $cyclo[R(CH_2=CH)SiNH]_q$.

7. The composition of claim 6 wherein R is methyl and q is at least 3.

8. The composition of claim 1 containing a free radical initiator as a catalyst to promote crosslinking.

9. The composition of claim 8 comprising about 85% by weight of a polysilazane which has been prepared by reacting methyldichlorosilane with ammonia and polymerizing the ammonolysis product with potassium hydride and which has a relative viscosity of 1.12-1.16, measured as a solution of 5% by weight of the polymer in tetrahydrofuran, and about 15% by weight of at least one unsaturated organosilicon compound corresponding to the formula $cyclo[CH_3(CH_2=CH)SiNH]_q$ in which q is at least 3.

10. A ceramic derived by pyrolyzing the composition of claim 1 at 850°-1400° C.

11. A fiber-reinforced ceramic composite densified with interspersed areas of a ceramic derived by pyrolyzing the composition of claim 1 at 850°-1400° C.

12. A process which comprises preparing a densified fiber-reinforced ceramic composite by immersing a porous fiber-reinforced ceramic composite in a liquid comprising the composition of claim 1 to infiltrate the pores of the composite with the composition, recovering the infiltrated composite, heating the infiltrated composite at 850°-1400° C. to pyrolyze the infiltrant, and optionally repeating the infiltration and pyrolysis one or more times to increase the densification of the composite; the pore of the porous composite optionally being subjected to removal of air therefrom before the composite is immersed in the liquid.

13. The process of claim 12 wherein the liquid in which the porous composite is immersed is a melt of the infiltrant and the infiltration is effected at a temperature of at least about 100° C.

14. The process of claim 13 wherein the infiltration is effected under pressure.

15. The process of claim 14 wherein the infiltration is effected at a temperature of about 100°-300° C. and a pressure of at least about 1.4 MPa.

16. The process of claim 15 wherein the porous composite is subjected to removal of air therefrom before it is immersed in the liquid.

17. The process of claim 16 wherein the infiltrant is a crosslinkable composition comprising (A) about 85% by weight of a polysilazane which has been prepared by reacting methyldichlorosilane with ammonia and polymerizing the ammonolysis product with potassium hydride and which has a relative viscosity of 1.12-1.16, measured as a solution of 5% by weight of the polymer in tetrahydrofuran, (B) about 15% by weight of at least one unsaturated organosilicon compound corresponding to the formula cyclo[$CH_3(CH_2=CH)SiNH$]$_q$ in which q is at least 3, and (C) a catalytic amount of a free radical initiator.

18. The process of claim 12 wherein the liquid in which the porous composite is immersed is a solution of the infiltrant in an organic solvent.

19. The process of claim 18 wherein the infiltrant is a crosslinkable composition comprising (A) about 85% by weight of a polysilazane which has been prepared by reacting methyldichlorosilane with ammonia and polymerizing the ammonolysis product with potassium hydride and which has a relative viscosity of 1.12-1.16, measured as a solution of 5% by weight of the polymer in tetrahydrofuran, (B) about 15% by weight of at least one unsaturated organosilicon compound corresponding to the formula cyclo[$CH_3(CH_2=CH)SiNH$]$_q$ in which q is at least 3, and (C) a catalytic amount of a free radical initiator.

20. A composition suitable for use in forming the matrix of a fiber/matrix composite and comprising about 30-60% by weight of the composition of claim 1 and about 70-40% by weight of a ceramic powder selected from silicon carbide, silicon nitride, and mixtures thereof or a mixture thereof with up to about 30% by weight of one or more polysilazanes.

* * * * *